(12) United States Patent
Joopudi et al.

(10) Patent No.: US 12,525,328 B2
(45) Date of Patent: Jan. 13, 2026

(54) HIERARCHY-AWARE ADVERSE REACTION EMBEDDINGS FOR SIGNAL DETECTION

(71) Applicant: International Business Machines Corporation, Armonk, NY (US)

(72) Inventors: Venkata Naga Sreeram Joopudi, Yorktown Heights, NY (US); Bharath Dandala, White Plains, NY (US); Ching-Huei Tsou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 17/556,976

(22) Filed: Dec. 20, 2021

(65) Prior Publication Data
US 2023/0197230 A1 Jun. 22, 2023

(51) Int. Cl.
*G16H 20/10* (2018.01)
*G16H 50/30* (2018.01)
*A61B 5/00* (2006.01)

(52) U.S. Cl.
CPC ............ *G16H 20/10* (2018.01); *G16H 50/30* (2018.01); *A61B 5/7267* (2013.01)

(58) Field of Classification Search
CPC ........ G16H 20/10; G16H 50/30; G16H 50/20; G16H 40/67; G16H 50/70; G16H 70/40; A61B 5/7267; G06N 3/0455; G06N 5/022; G06N 3/0475; G06N 3/098
See application file for complete search history.

(56) References Cited

U.S. PATENT DOCUMENTS

| 2013/0226616 | A1 | 8/2013 | Nigam | |
| 2017/0083670 | A1* | 3/2017 | Kosaka | G16H 50/20 |
| 2017/0116376 | A1* | 4/2017 | Fokoue-Nkoutche | G16H 70/40 |
| 2019/0228865 | A1* | 7/2019 | Dey | G16H 50/30 |
| 2019/0348179 | A1* | 11/2019 | Zhang | G06N 5/01 |

(Continued)

FOREIGN PATENT DOCUMENTS

| CN | 108831563 A | 11/2018 |
| CN | 109446338 A | 3/2019 |
| CN | 109446338 B | 3/2019 |

(Continued)

OTHER PUBLICATIONS

Aer2vec: Distributed Representations of Adverse Event Reporting System Data as a Means to Identify Drug/Side-Effect Associations.

(Continued)

*Primary Examiner* — Zhipeng Wang
(74) *Attorney, Agent, or Firm* — Kristofer Haggerty; Otterstedt & Kammer PLLC

(57) ABSTRACT

Systems and methods for adverse reaction detection. An electronic input is received, the electronic input comprising a drug and outcome pair. The drug and outcome pair is classified as having one of a positive control and a negative control and a probability measure of an adverse drug event relation is determined based on results of the classification. A neural network is trained to jointly leverage reported drug, outcome information and a heterogenous semantic hierarchy, and the classification of a candidate drug is performed using the trained neural network.

14 Claims, 7 Drawing Sheets

(56) References Cited

U.S. PATENT DOCUMENTS

2021/0142173 A1  5/2021  Cheng
2022/0261668 A1* 8/2022  Stumpe ................. G06F 16/284

FOREIGN PATENT DOCUMENTS

| CN | 110336631 B | 10/2020 |
|---|---|---|
| CN | 112669991 A | 4/2021 |
| WO | 0145774 W | 6/2001 |
| WO | 2023/117234 A1 | 6/2023 |

OTHER PUBLICATIONS

Authors: Anastopoulos I N et al.; Ttl: Multi-Drug Featurization and Deep Learning Improve Patient-Specific Predictions of Adverse Events; Publication Ttl: International Journal of Environmental Research and Public Health, vol. 18, No. 5, pp. count 11; 2021; Publisher: MDPI; Country of Publication: Switzerland; ISSN: 1660-4601; Database: SciSearch(R).

Authors: Park G et al.; Ttl: Comparison of Data Mining Methods for the Signal Detection of Adverse Drug Events with a Hierarchical Structure in Postmarketing Surveillance; Publication Ttl: Life-Basel, vol. 10, No. 8, pp. count 21; 2020; Publisher: MDPI; Country of Publication: Switzerland; ISSN: 2075-1729; Database: SciSearch(R).

Drug-disease Graph: Predicting Adverse Drug Reaction Signals via Graph Neural Network with Clinical Data.

Semantic Disambiguation of Embedded Drug-Disease Associations Using Semantically Enriched Deep-Learning Approaches.

SNF-NN: computational method to predict drug-disease interactions using similarity network fusion and neural networks.

Heeyoung Kwak et al: Drug-disease Graph: Predicting Adverse Drug Reaction Signals via Graph Neural Network with Clinical Data. Apr. 1, 2020. pp. 14.

Wawrzinek Janus et al:Semantic Disambiguation of Embedded Drug-Disease Associations Using Semantically Enriched Deep-Learning Approaches. Sep. 22, 2020 (Sep. 22, 2020), 16th European Conference, pp. 16.

Tamern Jarada et al: "SNF-NN: computational method to predict drug-disease interactions using similarity network fusion and neural networks", BMC Bioinformatics, Biomed Central Ltd, London, UK, vol. 22, No. 1, Jan. 22, 2021. pp. 20.

Priyanu, Pakpum T, Authorized officer, related application PCT/EP2022/082498, European Patent Office as ISA, International Search Report and Written Opinion Mar. 9, 2023. pp. 11.

Zhang et al., "Network representation learning: A survey", arXiv:1801.05852v3 [cs.SI], Jul. 19, 2018, 25 pages.

Abernethy et al., "Pharmacological mechanism-based drug safety assessment and prediction", Clinical Pharmacology & Therapeutics, Jun. 2011, pp. 793-797.

Amery et al., "Signal generation from spontaneous adverse event reports", Pharmacoepidemiology and Drug Safety, Mar. 1999, pp. 147-150.

Avillach et al., "Design and validation of an automated method to detect known adverse drug reactions in Medline: A contribution from the EU-ADR project.", Journal of the American Medical Informatics Association, May 1, 2013, pp. 446-452.

Chiang et al., "Data-driven methods to discover molecular determinants of serious adverse drug events", Clinical Pharmacology & Therapeutics, Mar. 2009, pp. 259-268.

Coloma et al., "A reference standard for evaluation of methods for drug safety signal detection using electronic healthcare record databases", Drug Safety, Jan. 2013, pp. 13-23.

Coloma et al., "Postmarketing safety surveillance : where does signal detection using electronic healthcare records fit into the big picture?", Drug Safety, Mar. 2013, pp. 183-197.

Freifeld et al., "Digital drug safety surveillance: Monitoring pharmaceutical products in Twitter", Drug Safety, May 2014, pp. 343-350.

Haerian et al., "Detection of pharmacovigilance-related adverse events using electronic health records and automated methods", Clinical Pharmacology & Therapeutics, Aug. 2012, pp. 228-234.

Harpaz et al., "Novel data-mining methodologies for adverse drug event discovery and analysis", Clinical Pharmacology & Therapeutics, Jun. 2012, pp. 1010-1021.

Harpaz et al., "Promise, Challenges, and State of the Art", Drug Safety, Oct. 2014, pp. 777-790.

Hauben et al., "Defining "signal" and its subtypes in pharmacovigilance based on a systematic review of previous definitions", Drug Safety, 2009, pp. 99-110.

Hazell et al., "Under-Reporting of Adverse Drug Reactions", Drug Safety, 2006, 12 pages.

Heiat et al., "Representation of the elderly, women, and minorities in heart failure clinical trials", Archives of Internal Medicine research, Aug. 2002, pp. 1682-1688 (19 pages).

Henry et al., "2018 n2c2 shared task on adverse drug events and medication extraction in electronic health records", Journal of the American Medical Informatics Association, Jan. 1, 2020, pp. 3-12.

Hochreiter et al., "Long short-term memory", Neural Computation, 1997, pp. 1735-1780.

Inácio et al., "The value of patient reporting to the pharmacovigilance system: a systematic review", Feb. 2017, pp. 227-246.

Jagannatha et al., "Overview of the First Natural Language Processing Challenge for Extracting Medication, Indication, and Adverse Drug Events from Electronic Health Record Notes (MADE 1.0)", Drug Safety, Jan. 2019, pp. 99-111.

Jan P. Vandenbroucke, "In defense of case reports and case series", Annals of Internal Medicine, Feb. 20, 2001, pp. 330-334.

Leaman et al., "Towards Internet-Age Pharmacovigilance: Extracting Adverse Drug Reactions from User Posts in Health-Related Social Networks", Proceedings of the 2010 Workshop on Biomedical Natural Language Processing, Jul. 15, 2010, pp. 117-125.

Lecun et al., "Gradient-based learning applied to document recognition", Proceedings of the IEEE, Nov. 1998, 46 pages.

Lependu et al., "Annotation Analysis for Testing Drug Safety Signals using Unstructured Clinical Notes", Journal of Biomedical Semantics, Apr. 24, 2012, 12 pages.

Lependu et al., "Pharmacovigilance using clinical notes", Clinical Pharmacology & Therapeutics, Jun. 2013, pp. 547-555.

Lopez-Gonzalez et al., "Determinants of under-reporting of adverse drug reactions: A systematic review", Drug Safety, 2009, pp. 19-31.

Martínez et al., "A survey of link prediction in complex networks", ACM Computing Surveys (CSUR), Dec. 20, 2016, 33 pages.

McGauran et al., "Reporting bias in medical research—a narrative review", Trials, Apr. 13, 2010, 15 pages.

Nick Black, "Why we need observational studies to evaluate the effectiveness of health care", BMJ, May 11, 1996, pp. 1215-1218.

Nikfarjam et al., "Pharmacovigilance from social media: mining adverse drug reaction mentions using sequence labeling with word embedding cluster features", J Am Med Inform Assoc., May 2015, pp. 671-681.

No Author, "Practical Aspects of Signal Detection in Pharmacovigilance: Report of CIOMS Working Group VIII", https://cioms.ch/publications/product/practical-aspects-of-signal-detection-in-pharmacovigilance-report-of-cioms-working-group-viii/, 2010, 146 pages.

No Author, "The importance of pharmacovigilance", https://iris.who.int/bitstream/handle/10665/42493/a75646.pdf, Jan. 1, 2002, 52 pages.

Odgers et al., "Analyzing search behavior of healthcare professionals for drug safety surveillance", Pacific Symposium on Biocomputing, 2015, pp. 306-317.

Papanikolaou et al., "Comparison of evidence on harms of medical interventions in randomized and nonrandomized studies", Canadian Medical Association Journal (CMAJ), Feb. 28, 2006, pp. 635-641.

PK Honig et al., "Advancing the science of pharmacovigilance", Clinical Pharmacology & Therapeutics, Jun. 2013, pp. 474-475.

Pontes et al., "Safety signal detection: The relevance of literature review", Drug Safety, Jul. 2014, pp. 471-479.

Rosenthal et al., "Leveraging medical literature for section prediction in electronic health records", In: EMNLP-IJCNLP 2019—2019 Conference on Empirical Methods in Natural Language Processing

(56) References Cited

OTHER PUBLICATIONS and 9th International Joint Conference on Natural Language Processing, Proceedings of the Conference, Nov. 2019, pp. 4864-4873.

Rothman et al., "The reporting odds ratio and its advantages over the proportional reporting ratio", Pharmacoepidemiology Drug Safety, Aug. 2004, pp. 519-523.

Ryan et al., "Defining a reference set to support methodological research in drug safety", Drug Safety, Oct. 2013, pp. S33-S47.

Sarker et al., "Utilizing social media data for pharmacovigilance: A review", Journal of Biomedical Informatics, Apr. 2015, pp. 202-212.

Shetty et al., "Using information mining of the medical literature to improve drug safety", Journal of the American Medical Informatics Association, Sep.-Oct. 2011, pp. 668-674.

Stang et al., "Advancing the science for active surveillance: Rationale and design for the observational medical outcomes partnership", Annals of Internal Medicine, Nov. 2, 2010, pp. 600-606.

Sun et al., "Rotate: Knowledge graph embedding by relational rotation in complex space", arXiv:1902.10197v1 [cs.LG], Feb. 26, 2019, 18 pages.

Tatonetti et al., "A novel signal detection algorithm for identifying hidden drug-drug interactions in adverse event reports", Jan.-Feb. 2012, pp. 79-85.

Van Puijenbroek et al., "A comparison of measures of disproportionality for signal detection in spontaneous reporting systems for adverse drug reactions", Pharmacoepidemiology and Drug Safety, Jan.-Feb. 2002, pp. 3-10.

Vaswani et al., "Attention Is All You Need", arXiv:1706.03762v7 [cs.CL], Aug. 2, 2023, 15 pages.

Vilar et al., "Facilitating adverse drug event detection in pharmacovigilance databases using molecular structure similarity: Application to rhabdomyolysis", Journal of the American Medical Informatics Association, Dec. 2011, pp. i73-i80.

White et al., "Toward enhanced pharmacovigilance using patient-generated data on the internet", Clinical Pharmacology & Therapeutics, May 7, 2014, pp. 239-246.

White et al., "Web-scale pharmacovigilance: Listening to signals from the crowd", Journal of the American Medical Informatics Association, May 2013, pp. 404-408.

Wilson et al., "Application of data mining techniques in pharmacovigilance", British Journal of Clinical Pharmacology, Feb. 2004, pp. 127-134.

Wu et al., "A comprehensive survey on graph neural networks", arXiv:1901.00596v4 [cs.LG], Dec. 4, 2019, 22 pages.

Yom-Tov et al., "Postmarket drug surveillance without trial costs: Discovery of adverse drug reactions through large-scale analysis of web search queries", Journal of Medical Internet Research, Jun. 18, 2013, 12 pages.

Zhang et al., "Learning hierarchy-aware knowledge graph embeddings for link prediction", arXiv:1911.09419v3 [cs.LG], Apr. 6, 2022, 10 pages.

\* cited by examiner

| Drug  | Event     | Cases | Percentage |
|-------|-----------|-------|------------|
| Drug x | Cough     | 6,354 | 6.35       |
|        | Headache  | 2,821 | 2.82       |
|        | Fever     | 634   | 0.63       |
| Drug y | Dizziness | 1,108 | 1.11       |
|        | Fever     | 223   | 0.22       |

*FIG. 3*

| Metric | Datasets | |
|---|---|---|
| | First Dataset (AUPRC) | Second Dataset (AUPRC) |
| PRR | 0.941 | 0.729 |
| ROR | 0.941 | 0.723 |
| aer2vec+ | 0.968 | 0.844 |
| HARE | 0.973 | 0.862 |

*FIG. 6*

HIERARCHY-AWARE ADVERSE REACTION EMBEDDINGS FOR SIGNAL DETECTION

BACKGROUND

The present invention relates to the electrical, electronic and computer arts, and more specifically, to adverse reaction detection systems.

Pharmacovigilance is defined by the World Health Organization (WHO) as "the science and activities relating to the detection, assessment, understanding and prevention of adverse effects or any other drug-related problem." As the definition suggests, pharmacovigilance has a pivotal role in improving patient care and safety with timely identification of adverse effects or adverse drug reactions (ADRs) caused by medicinal products. While safety and efficacy of medicinal products are tested during randomized clinical trials before marketing, these trials may not detect all ADRs because such studies are often small, short, and biased by the exclusion of patients with co-morbid diseases. Therefore, post-market drug safety surveillance is used to monitor medicinal products for their safety and efficacy in real-life conditions. Spontaneous reporting systems(SRS), such as the U.S. Food and Drug Administration Adverse Event Reporting System (FAERS), the European Medicines Agency's EudraVigilance, and WHO's VigiBase are monitoring mechanisms established for post-marketing safety surveillance, which enable product manufacturers, health care professionals, and patients to report ADRs or medication errors. The collection and systematic assessment of these individual case safety reports (ICSRs), obtained through spontaneous reporting systems, has become vital to detecting safety concern signals for marketed medicinal products. Early efforts on signal detection started with the manual review of ICSRs by trained pharmacovigilance professionals. Exponential growth of ICSRs, obtained electronically through spontaneous reporting systems, and growing interest in quantitative analysis of spontaneous reports, have spurred the development of several methodologies for automated signal detection. Consequently, the Council for International Organizations of Medical Sciences (CIOMS) convened working group VIII "in order to develop consensus Points to Consider in the development and application of quantitative methods for signal detection" using SRS databases. In 2010, the conclusions of this working group were published in a report named "Practical Aspects of Signal Detection in Pharmacovigilance." This report contains definitions of pharmacovigilance, taxonomy of drug safety signals, quantitative and qualitative data mining methods of signal detection from SRS databases, evaluation of these methods, and future directions to pharmacovigilance. This working group adapted the definition of a "pharmacovigilance signal," formally defined as:

" . . . information that arises from one or multiple sources (including observations and experiments), which suggests a new potentially causal association, or a new aspect of a known association, between an intervention and an event or set of related events, either adverse or beneficial, that is judged to be of sufficient likelihood to justify verificatory action."

As suggested in the definition, several signal detection algorithms (SDA) have been developed using disparate information sources, including spontaneous reporting systems, electronic health records, literature mining, social media, web search queries via search engine logs, and Biology and Chemistry knowledge bases. Among these SDAs, disproportionality analysis (DPA), based on SRS reports that calculate a measure of association strength between the drug and health outcome, have been a cornerstone for pharmacovigilance. While several algorithms have been proposed, several studies have exposed various inadequacies with SRS systems, including under-reporting, reporting biases, and incomplete information. Further, the SDAs based on proposed statistical methods lack the ability to leverage higher-order similarities between drugs (e.g., selective cox-2 inhibitors) and related side-effects (e.g., myocardial infarction and other cardiac events such as stroke) to calculate the strength of association. This situation is analogous to the task of link prediction in knowledge graphs, which utilizes the existing information to infer new relations. In recent times, network representation learning (NRL) or graph embedding methods that aim to learn latent, low-dimensional representation for each vertex in knowledge graphs have aroused a lot of interest for link prediction. Several NRL methods have been proposed to model patterns such as symmetry, inversion, and composition. However, limited work has been proposed to use NRL methods of signal detection.

SUMMARY

Principles of the invention provide techniques for adverse reaction signal detection. In one aspect, an exemplary method includes the operations of receiving an electronic input, the electronic input comprising a drug and outcome pair; classifying the drug and outcome pair as having one of a positive control and a negative control; determining a probability measure of an adverse drug event relation based on results of the classification; training a neural network to jointly leverage reported drug, outcome information and a heterogenous semantic hierarchy; and performing a classification of a candidate drug using the trained neural network.

In one aspect, an apparatus comprises a memory and at least one processor, coupled to the memory, and operative to perform operations comprising receiving an electronic input, the electronic input comprising a drug and outcome pair; classifying the drug and outcome pair as having one of a positive control and a negative control; determining a probability measure of an adverse drug event relation based on results of the classification; training a neural network to jointly leverage reported drug, outcome information and a heterogenous semantic hierarchy; and performing a classification of a candidate drug using the trained neural network.

In one aspect, a computer program product for federated learning comprises a computer readable storage medium having program instructions embodied therewith, the program instructions executable by a computer to cause the computer to perform operations comprising receiving an electronic input, the electronic input comprising a drug and outcome pair; classifying the drug and outcome pair as having one of a positive control and a negative control; determining a probability measure of an adverse drug event relation based on results of the classification; training a neural network to jointly leverage reported drug, outcome information and a heterogenous semantic hierarchy; and performing a classification of a candidate drug using the trained neural network.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

a novel network representation learning (NRL) method, entitled Hierarchy-aware Adverse Reaction Embeddings (HARE), for effective adverse reaction signal detection in which a neural network is trained to jointly leverage drug and outcome information in case reports, heterogeneous semantic hierarchies (such as a heterogeneous semantic hierarchy of medical terminology (HSHMT), a heterogeneous semantic hierarchy of drug classes (HSHDC)), and the like;

employment of an edge weighting approach for generated negative edges based on a frequency of an associated drug and outcome pair in case reports database during the training of the neural network for adverse reaction signal detection; and better accuracy (precision and recall) than other disproportionality methods, such as proportional reporting ratio (PRR) and reporting odds ratio (ROR), and conventional neural network methods.

Some embodiments may not have these potential advantages and these potential advantages are not necessarily required of all embodiments. These and other features and advantages of the present invention will become apparent from the following detailed description of illustrative embodiments thereof, which is to be read in connection with the accompanying drawings.

BRIEF DESCRIPTION OF THE DRAWINGS

FIG. 3 illustrates adverse reactions and their associated frequency for example drugs from case reports;

FIG. 6 shows the comparison of results between existing approaches and an example embodiment, in accordance with an example embodiment.

DETAILED DESCRIPTION

Figure 1:
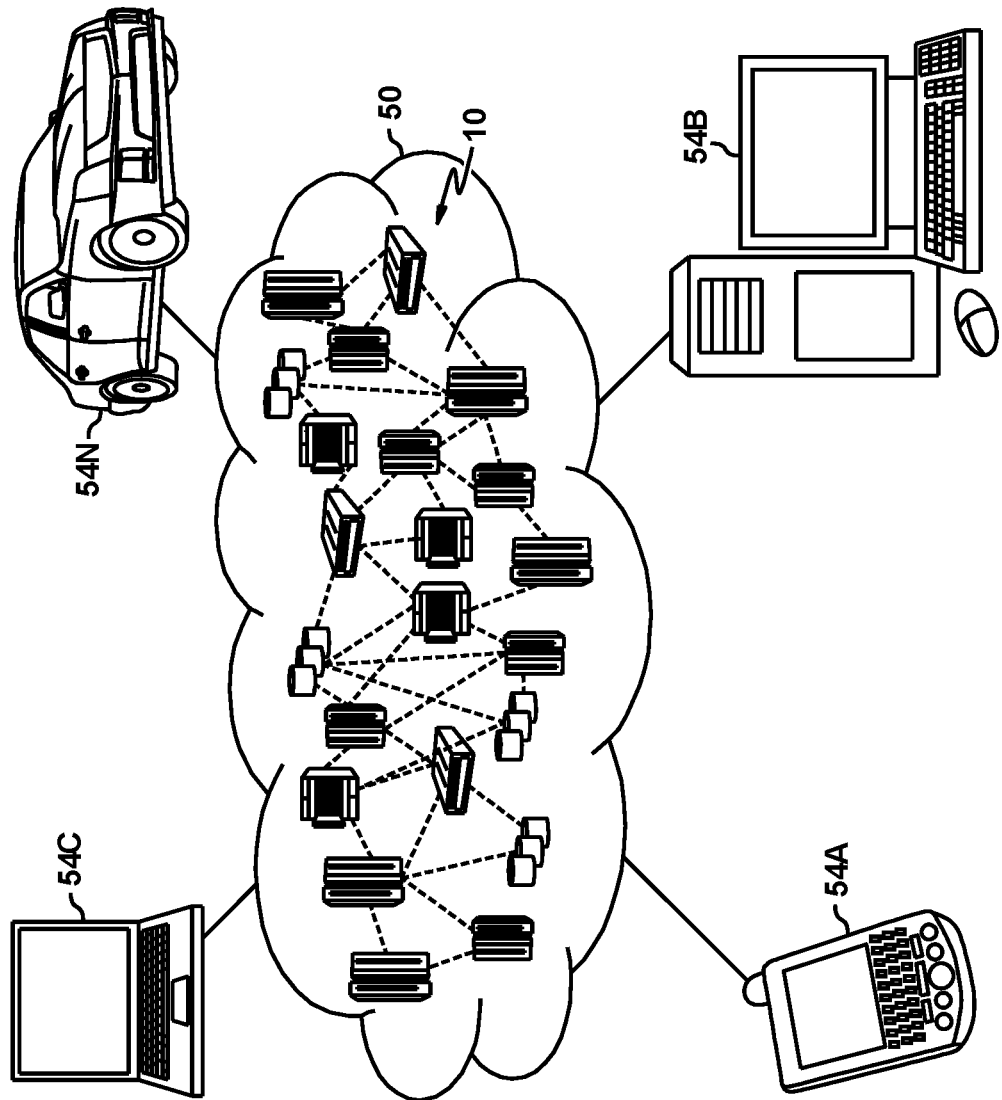
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
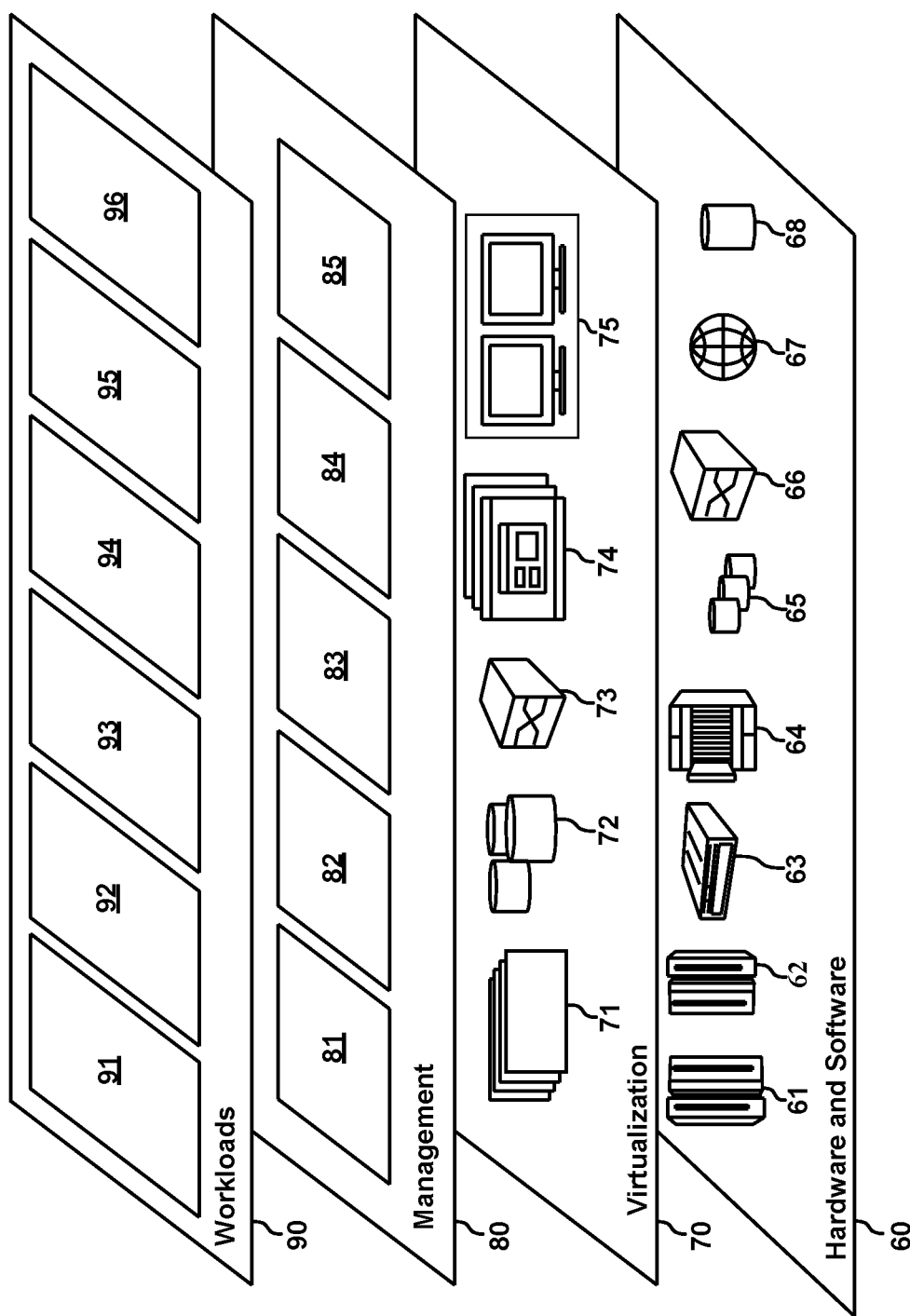
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and at least a portion of an adverse reaction detection and monitoring component 96. For example, the trained neural network parameters can be stored in a cloud solution and can be used for computing the strength of an adverse reaction signal for a given drug and outcome pair.

Generally, systems and methods for detecting and monitoring adverse reactions are disclosed. In one example embodiment, a novel NRL method, entitled Hierarchy-aware Adverse Reaction Embeddings (HARE), is disclosed in which a neural network is trained to jointly leverage drug and outcome information in case reports, heterogeneous semantic hierarchies (such as HSHMT, HSHDC), and the like, for effective signal detection.

Transformer

The Transformer is an encoder-decoder model, familiar to the skilled artisan, that uses stacked multi-head self-attention and fully connected layers for both the encoder and decoder. The encoder includes N layers, each containing two sub-layers: (a) a multi-head self-attention mechanism, and (b) a feed-forward network. The multi-head attention mechanism relies on scaled dot-product attention, which operates on a query Q, a key K and a value V:

$$\text{Attention}(Q, K, V) = \text{softmax}\left(\frac{QK^T}{\sqrt{d_k}}\right)V$$

where $d_k$ is the key dimensionality. In self-attention, queries, keys and values come from the output of the previous layer. The multi-head attention mechanism obtains h (i.e., one per head) different representations of (Q, K, V), computes scaled dot-product attention for each representation, concatenates the results, and projects the concatenation through a feed-forward layer. This can be expressed in the same notation as the following equations:

$$\text{head}_i = \text{Attention}(QW_i^Q, KW_i^K, VW_i^V)$$

$$\text{MultiHead}(Q,K,V) = \text{Concat}_i(\text{head}_i)W^o$$

where the $W_t$ and $W^o$ are parameter matrices.

The multi-head attention mechanism is the main building block of transformers, and helps to better capture long-range dependencies between elements in a sequence, as compared to other neural network architectures, such as recurrent neural networks (RNN, including long-short term memory (LSTMs)) and convolutional neural networks (CNNs)). For a specific type of graphs, such as trees, it is possible to define a well-defined sequence (a path starting from the desired leaf node to the root node) and use transformers for learning node representations of the network. However, many real-world networks do not fall in the realm of tree-networks and thus the regular transformer architectures cannot be directly used. Most of the real-world networks are directed acyclic graphs with each leaf node having multiple ancestors and thus multiple paths (sequences) existing between the leaf node to root node. The entire hierarchy (multiple paths) encapsulates the established knowledge around the leaf node, and thus network representation learning methods are hypothesized that leverage this entire hierarchy, which has the potential to learn better representations of the leaf node.

Adverse Event Reporting System (AERS)

An Adverse Event Reporting System (AERS) is a database that contains information on adverse event and medication error reports. The database is designed to support post-marketing safety surveillance programs for drug and therapeutic biologic products. The informatic structure of the AERS database adheres to international safety reporting guidance. Adverse events and medication errors are coded to terms in the heterogeneous semantic hierarchy of medical terminology. Drug members are coded to terms. FIGS. 3A, 3B, and 3C present a holistic overview of information available in the AERS database. FIG. 3 illustrates adverse reactions and their associated frequency for example drugs from AERS case reports.

Knowledge Hierarchies

Systems for unambiguously identifying brand-name and generic drugs are generally available and emerged as a response to the proliferation of drug identification and classification systems among hospitals, clinics, pharmacies, health systems, manufacturers, and payers—all of which might use an array of different names for the same drug, making it difficult to extract meaningful information and communicate across different systems and databases.

Drug classes constitute important information about the drugs that are critical to important use cases, such as clinical decision support. Web applications for exploring and navigating through these drug class hierarchies to find the drug members associated with each class are generally available. HSHDC links drug members (usually ingredients, precise ingredients and multiple ingredients) to various drug class hierarchies that capture properties of a drug member in multiple dimensions (such as chemical structure, drug disposition, pharmacological action, clinical kinetics, and the like).

The HSHMT was designed to classify a wide range of regulatory information for medical products used by humans, including adverse events, such as signs, symptoms, diseases and diagnoses, therapeutic indications, qualitative results of investigations (e.g. laboratory tests), surgical and medical procedures, health effects, malfunction of devices, and medical, social, and family history. HSHMT terms are arranged in a five-tiered multi-axial hierarchy, which provides increasing specificity as one descends it. There are five levels to the HSHMT hierarchy, arranged from very specific to very general. At the most specific level, called "Lowest Level Terms" (LLTs), there are more than 70,000 terms. These LLTs reflect how an observation might be reported in practice. This level directly supports assigning HSHMT terms within a user database. Each member of the next level, "Preferred Terms" (PTs), is a distinct descriptor (single medical concept) for a symptom, sign, disease diagnosis, therapeutic indication, investigation, surgical or medical procedure, and medical social or family history characteristic. Each LLT is linked to only one PT. Each PT has at least one LLT (itself) as well as synonyms and lexical variants (e.g., abbreviations, different word order, and the like). Related PTs are grouped together into "High Level Terms" (HLTs) based upon anatomy, pathology, physiology, etiology or function. HLTs, related to each other by anatomy, pathology, physiology, etiology or function, are in turn linked to "High Level Group Terms" (HLGTs). Finally, HLGTs are grouped into "System Organ Classes" (SOCs) which are groupings by etiology (e.g., infections and infestations), manifestation site (e.g., gastrointestinal disorders) or purpose (e.g., surgical and medical procedures). In addition, there is an SOC to contain issues pertaining to products and one to contain social circumstances.

Figure 4:
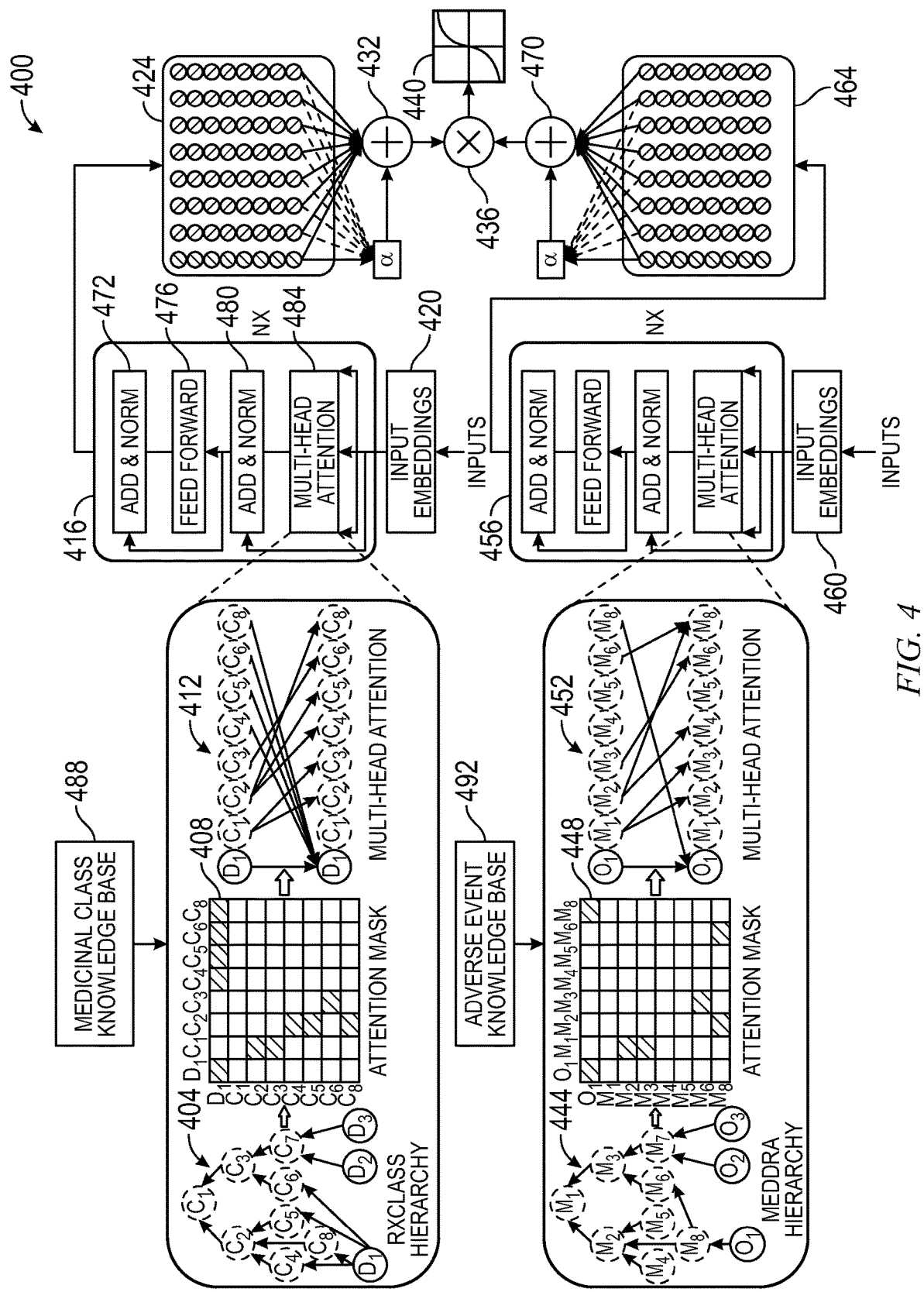
FIG. 4 illustrates an overview of the Hierarchy-aware Adverse Reaction Embeddings (HARE) architecture and presents the computation of adverse drug relation strength between drug $D_1$ and disease $O_1$, in accordance with an example embodiment.

FIG. 4 illustrates an overview of the HARE architecture and presents the computation of adverse drug relation strength between drug $D_1$ and disease $O_1$, in accordance with an example embodiment. Formally, Let E be the overall embedding matrix for drugs ($D_1, D_2, \ldots D_j$), drug classes ($C_1, C_2, \ldots C_l$), adverse reactions (adverse events) or outcomes ($O_1, O_2, \ldots O_k$) and HSHMT classes ($M_1, M_2, \ldots M_1$), $A^D$ be the adjacency matrix 408 obtained from combining drug and drug classes, i.e. HSHDC hierarchy graph 404 and related resources, and $A^o$ be the adjacency matrix 448 obtained from the HSHMT hierarchy:

For a given drug and outcome pair ($D_1, O_1$) from the AERS database, let C={$C_1, C_2, \ldots C_N$} and M={$M_1, M_2, \ldots M_R$} represent the HSHDC and HSHMT ancestors of $D_1$ and $O_1$, respectively, as represented by the Rx class graph 404 and the adverse event graph 444. Then, let $x_D = \{D_1, C_1, \ldots C_N\}$ and $x_O = \{O_1, M_1, \ldots M_R\}$ be the inputs corresponding to $D_i$ and $O_1$, respectively. These inputs are supplied to the two transformers 416, 456 as shown in FIG. 4.

The procedure for computing the hierarchical representation of $O_1$ is similar to that of $D_1$ and thus, for brevity, the following equations are limited to $D_1$.

Let $X^o = \{e_{d_1}, e_{c_1}, \ldots e_{c_n}\}$ represent the input embedding layer 420 obtained from E for $x_D$ and $X^i$ represent the output representation of an input sequence ($x_D$) from the $i^{th}$ layer of the transformer 416, where a multi-head attention sub-layer 484, a normalization sub-layer 480, a feed-forward sub-layer 476, and a final normalization sub-layer 472 represent the $i^{th}$ layer of the transformer 416. The embedding lookup is performed and the input for the first layer of the transformer 416 is generated. Then:

$$m_j^i = \bigoplus_{h=1}^{H} \sum_{l=0}^{N} \alpha_{jl}^h * (X_l^{i-1} * W_{i,v}^h) \quad (1)$$

$$\alpha_{jl}^h = \frac{\exp(b_{jl}^h)}{\sqrt{\frac{d}{H}} * \sum_{n=0}^{N} \exp(b_{jn}^h)} \quad (2)$$

$$b_{jl}^h = \text{Hierarchical\_Mask}((X_j^{i-1} * W_{i,q}^h) * (X_l^{i-1} * W_{i,k}^h), A_{jl}^D + I_{jl}) \quad (3)$$

where $m^i = \{m_0^i, m_1^i, \ldots, m_N^i\}$ represents the output representations from the multi-head attention sub-layer 484 of the $i^{th}$ layer of the transformer 416, $\oplus$ represents the concatenation of H attention heads, and $\alpha_{jl}^h$ is the attention weight corresponding to the $j^{th}$ element. The output of the multi-head attention sub-layer 484 is passed to a normalization sub-layer 480 (implemented based on equation (4)) followed by a feed-forward sub-layer 476 (implemented based on equation (5)) and the final normalization sub-layer 472 of each layer.

$$M_j^i = \text{Layer\_Norm}(m_j^i + X_j^{i-1}) \quad (4)$$

$$F_j^i = (W^i * m_j^i) \quad (5)$$

$$X_j^i = \text{Layer\_Norm}(F_j^i + m_j^i) \quad (6)$$

where the input to the next layer of the transformer 416. In one example embodiment, $X_j^i$ is generated by the final normalization sub-layer 472.

The final drug-representation $\widehat{R_{x_0}}$ is generated by summation unit 432 based on equation (7) and is computed by passing the output ($X^N$) of the transformer 416 to a regular multi-head attention layer 424 (implemented based on equations (8) and (9)) by considering the first element ($x_0$) as the lone query-element $$\widehat{R_{x_0}} = \bigoplus_{h=1}^{H} \sum_{l=0}^{N} \alpha_{0l}^h * (X_l^N * W_v^h) \quad (7)$$

$$\alpha_{0l}^h = \frac{\exp(b_{0l}^h)}{\sqrt{\frac{d}{H}} * \sum_{n=0}^{N} \exp(b_{0n}^h)} \quad (8)$$

$$b_{0l}^h = (X_0^N * W_q^h) * (X_l^N * W_k^h) \quad (9)$$

Similarly, the final representation, $\hat{R}_{O_1}$, of an adverse event $O_1$ is computed by leveraging its ancestors from the HSHMT hierarchy. By combining these representations, the strength (probability measure) of an adverse drug event relation between the drug $D_1$ and adverse event $O_1$ is calculated by using a sigmoid function on their dot product, as performed by dot product unit 436, and is shown below:

$$\hat{P}_{adv}(D_1, O_1) = \frac{1}{1 + \exp(-\hat{R}_{D_1} * \hat{R}_{O_1})} \quad (10)$$

In general, the system 400 computes the adverse drug relation strength between a drug $D_1$ and an adverse event (such as a disease) $O_1$. Initially, the drug $D_1$ and the adverse event $O_1$ of interest are taken as input. As noted above, the input embeddings 420 are based on $X^0 = \{e_{d_1}, e_{c_1}, \ldots e_{c_n}\}$.

The matrix of the attention mask 408 is generated by analyzing the edges of the graph 404 that represents the HSHDC Hierarchy. For example, drug $D_1$ has edges to categories $C_4$, $C_5$ $C_6$, and $C_8$, as represented by the first row of the attention mask 408. Based on the attention mask 408, the multi-head attention 412 is generated. The multi-head attention 412 shows the edges between each category $C_x$ that is an ancestor of drug $D_1$ and the immediate child(ren) of the category $C_x$.

The transformer 416 includes $N_x$ layers, where each layer includes the multi-head attention sub-layer 484, the normalization sub-layer 480, the feed-forward sub-layer 476, and the final normalization sub-layer 472. The output of one layer of the transformer 416 feeds the input of the next higher layer of the transformer 416. As noted above, the multi-head attention sub-layer 484 implements equations (1)-(3), the normalization sub-layer 480 implements equation (4), the feed-forward sub-layer 476 implements equation (5), and the final normalization sub-layer 472 implements equation (6). The $N_y$ layers of the transformer 456 similarly implement equations (1)-(6). In one example embodiment, the number of layers x of the transformer 416 equals the number of layers y of the transformer 456. In one example embodiment, the number of layers x of the transformer 416 is different than the number of layers y of the transformer 456.

As described more fully above, the final drug-representation $\hat{R}_{x_0}$ is generated by summation unit 432 based on equation (7) and is computed by passing the output ($X^N$) of the transformer 416 to a regular multi-head attention layer 424, implemented based on equations (8) and (9). Similarly, the final representation, $\hat{R}_{O_1}$, of an adverse event $O_1$ is computed by leveraging its ancestors from the HSHMT hierarchy. By combining these representations, the strength (probability measure) of an adverse drug event relation between the drug $D_1$ and adverse event $O_1$ is calculated by using a sigmoid function on their dot product, as performed by dot product unit 436. In one example embodiment, the multi-head attention layer 424, the summation unit 432, and the dot product unit 436 are implemented on an array of graphical processing units (GPUs).

Figure 5:
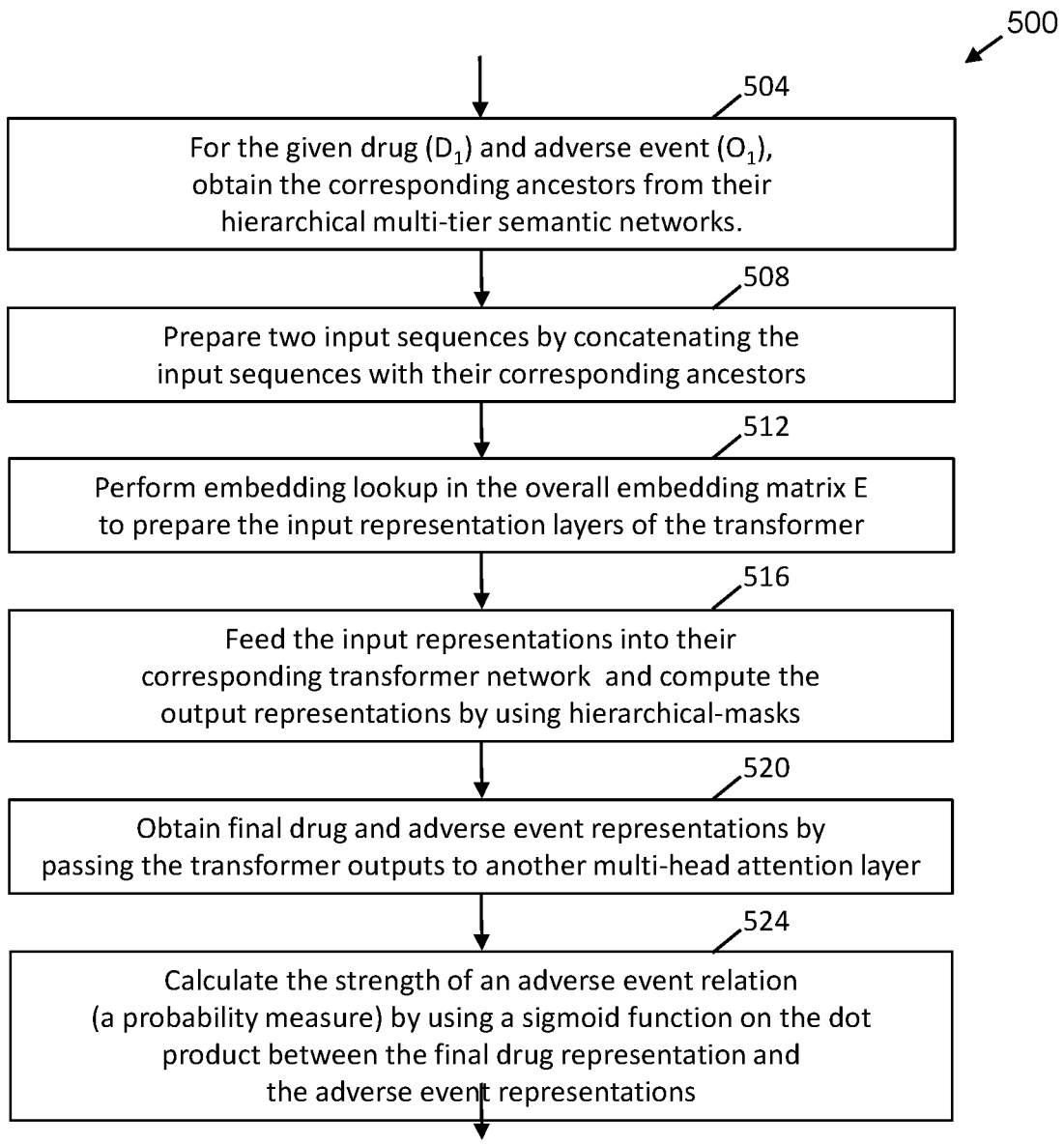
FIG. 5 is a flowchart of an example method for detecting a signal of an adverse drug event, in accordance with an example embodiment.

FIG. 5 is a flowchart of an example method 500 for detecting a signal of an adverse drug event, in accordance with an example embodiment. In one example embodiment, the corresponding ancestors for a given drug $D_1$ and an adverse event $O_1$ are obtained from their corresponding hierarchical multi-tier semantic networks (HSHDC, HSHMT) (operation 504). Input sequences for a corresponding transformer 416, 456 are prepared by concatenating the input sequences with their corresponding ancestors (operation 508). An embedding lookup is performed by input embeddings layers 420, 460 in the overall embedding matrix E to prepare the input representation layers of the transformer 416, 456 (operation 512). The input representations are fed into their corresponding transformer 416, 456 and the output representations of the transformers 416, 456 are computed using hierarchical-masks (operation 516). A final drug representation and an adverse event representation are obtained by passing the outputs of the transformers 416, 456 to another multi-head attention layer 424, 464 and a corresponding summation unit 432, 470, respectively (operation 520). The strength of an adverse event relation (a probability measure) is calculated by using a sigmoid function on the dot product, such as performed by the dot product unit 436, between the final drug representation and the adverse event representation (operation 524).

In one example embodiment, a potential adverse effect of a drug based on one or more adverse effects of a similar drug and the determined probability is identified.

In one example embodiment, an adverse event signal for a given drug is detected based on the determined probability.

In one example embodiment, one or more studies to conduct for evaluating a given drug are identified based on a detection of a new adverse reaction. For example, a study may be identified for a new vaccine that is similar to an old vaccine based on the detection of known adverse reactions. For a new drug, what new reactions to look for and what studies to conduct (and for what demographic populations) is determined based on the Rx class hierarchy.

In one example embodiment, one or more adverse events to be alert for (in regard to a given drug) are identified based on the location of the given drug in the HSHDC hierarchy graph 404.

Training

The AERS aggregates the frequency counts of drugs and associated adverse events. From the AERS database, a weighted bipartite graph is constructed by using drugs and adverse events as two disjoint sets, and frequency counts in the AERS database representing strength of association between a drug and an adverse event. Edge-sampling methods are used to proportionately sample edges, based on their frequency, from this database. For each sampled edge (positive sample), multiple negative edges are generated while retaining the same adverse event and randomly sampling drugs. However, often times this process results in negative pairs that are already present in AERS. Instead of discarding such pairs, their frequency counts are leveraged into generating instance weights and instance weights are used during the training process. Mutual information methods such as Positive pointwise mutual information are used in computing the instance weights given that they are robust to low frequency counts. Overall, the objective function of the disclosed method is to minimize the cross-entropy loss on the estimated adverse drug event relation scores from the positive and negative pairs generated from AERS corpus.

$$\text{Loss} = \sum_{(D_i, A_i) \in P_{os}} -\log \hat{P}_{adv}(D_i, O_i) - \sum_{(D_i, A_k) \in N_{eg}} W_{(D_i, A_k)} * \log(1 - \hat{P}_{adv}(D_i, O_i))$$

Evaluation Datasets

Two existing manually created reference sets were used to evaluate the disclosed approach for ADR signal detection and estimate its accuracy.

The first dataset contains 4 ADEs each with positive and negative control drug set. There are 100+ positive controls (drugs that are known to cause an ADEs) and 200+ negative controls (drugs that are known to not cause the ADEs) across four ADEs: myocardial infarction, gastrointestinal bleeding, liver injury and kidney injury.

The second dataset initially developed in 2012, contains 10 adverse drug events (ADEs) with positive and negative control drug set. There are 40+ positive controls (drugs that are known to cause an ADEs) and 50 negative controls (drugs that are known to not cause the ADEs) across 10 ADEs: liver disorder, acute myocardial infarction, renal failure acute, anaphylactic shock, erythema multiform, mitral valve disease, neutropenia, aplastic anemia, rhabdomyolysis, and gastrointestinal hemorrhage.

Evaluation metrics and Results

Disproportionality methods such as proportional reporting ratio (PRR) and Reporting odds ratio (ROR) are largely used to identify statistical association between products and outcomes in the adverse drug event databases. The PRR is a statistic that is used to summarize the extent to which a particular adverse event is reported for individuals taking a specific drug, compared to the frequency at which the same adverse event is reported in the database. In contrast, the Reporting ROR is the odds of a certain adverse event occurring with a particular medicinal product, compared to the odds of the same event occurring with all other medicinal products in the database. A conventional representation approach that leverages information in the AERS database to train a skip-gram-with-negative-sampling (SGNS) model showed promising results.

For each drug or adverse event pair in the two reference datasets, disproportionality metrics (PRR/ROR) were calculated, as well as results from a current state-of-the-art model. These scores were used to estimate the area under the precision recall curve (AUPRC) to provide a basis for comparison. In order to account for variance in the stochastic initialization of the embedding weights, each conventional MODEL 3 was retrained 10 times, and mean AUPRC was reported across the runs. FIG. 6 shows the comparison of results between existing approaches and an example embodiment, in accordance with an example embodiment.

Given the discussion thus far, it will be appreciated that, in general terms, an exemplary method, according to an aspect of the invention, includes the operations of receiving an electronic input, the electronic input comprising a drug and outcome pair; classifying the drug and outcome pair as having one of a positive control and a negative control; determining a probability measure of an adverse drug event relation based on results of the classification; training a neural network to jointly leverage reported drug, outcome information and a heterogenous semantic hierarchy; and performing a classification of a candidate drug using the trained neural network.

In one example embodiment, a neural network 416, 456 is trained to jointly leverage reported drug and outcome information and the classification of the drug and outcome pair is performed. In one example embodiment, the reported drug and outcome information are accessed in one or more of an adverse event reporting system and a heterogeneous semantic hierarchy 444.

In one example embodiment, the drug of the drug and outcome pair is mapped to a drug class hierarchy using a medicinal class knowledge base 488. In one example embodiment, the outcome of the drug and outcome pair is mapped to an outcome hierarchy using an adverse event knowledge base 492. In one example embodiment, a drug and a corresponding drug class hierarchy are inputted as a directed acyclic graph 404, 444 into a first masked transformer 416 followed by a position-aware self-attention layer 424 to generate a single vector representation; an outcome and a corresponding adverse event hierarchy 444 are inputted into a second masked transformer 456 to generate an outcome vector representation; negative outcome samples are generated using a probabilistic distribution computed based on frequency counts of outcomes in an adverse event knowledge base 492; a negative outcome and the corresponding adverse event hierarchy 444 are inputted into the second masked transformer 456 to generate a negative outcome vector representation; and a binary classifier 400 is trained using drug-outcome as a positive example representation and drug-negative outcome as a negative example representation (all the elements in FIG. 4 encompasses the binary classifier; the output of 440 returns a probability measure which is used in the loss function for training the binary classifier).

In one example embodiment, one or more ancestors of a drug and an adverse event of the drug and outcome pair are obtained from a corresponding hierarchical multi-tier semantic network (directed acyclic graphs 404, 444) the input sequences are concatenated with their corresponding ancestors; an embedding lookup is performed in an overall embedding matrix to prepare an input representation layer for each of a pair of transformers 416, 456; the input representation layers are processed using the corresponding transformer 416, 456 and an output representation is computed by using a hierarchical-mask corresponding to each of the transformers 416, 456; a final drug representation and an adverse event representation are obtained by passing outputs of the transformers 416, 456 to another multi-head attention layer 432; and a strength of an adverse event relation between the drug and the adverse event is calculated by using a sigmoid function on a dot product 436 between the final drug and adverse event representation. In one example embodiment, a potential adverse effect of the candidate drug is identified based on one or more adverse effects of the drug and the determined probability.

In one example embodiment, an adverse event signal for the drug is detected based on the determined probability. In one example embodiment, an administration of the drug is prevented in response to the probability measure being less than a probability threshold. In one example embodiment, the drug is administered in response to the probability measure being greater than or equal to the probability threshold. In one example embodiment, one or more studies to conduct for evaluating the drug are identified based on detection of a new adverse reaction. One or more embodiments further include carrying out the identified studies. In one example embodiment, one or more adverse events to be alert for in regard to the drug and a location in the medicinal class hierarchy graph 404 corresponding to the drug are identified. One or more embodiments further include detecting the identified events.

In one aspect, an apparatus comprises a memory and at least one processor, coupled to the memory, and operative to perform operations comprising receiving an electronic input, the electronic input comprising a drug and outcome pair; classifying the drug and outcome pair as having one of a positive control and a negative control; determining a probability measure of an adverse drug event relation based on results of the classification; training a neural network to jointly leverage reported drug, outcome information and a heterogenous semantic hierarchy; and performing a classification of a candidate drug using the trained neural network.

In one aspect, a computer program product for federated learning comprises a computer readable storage medium having program instructions embodied therewith, the program instructions executable by a computer to cause the computer to perform operations comprising receiving an electronic input, the electronic input comprising a drug and outcome pair; classifying the drug and outcome pair as having one of a positive control and a negative control; determining a probability measure of an adverse drug event relation based on results of the classification; training a neural network to jointly leverage reported drug, outcome information and a heterogenous semantic hierarchy; and performing a classification of a candidate drug using the trained neural network.

Figure 7:
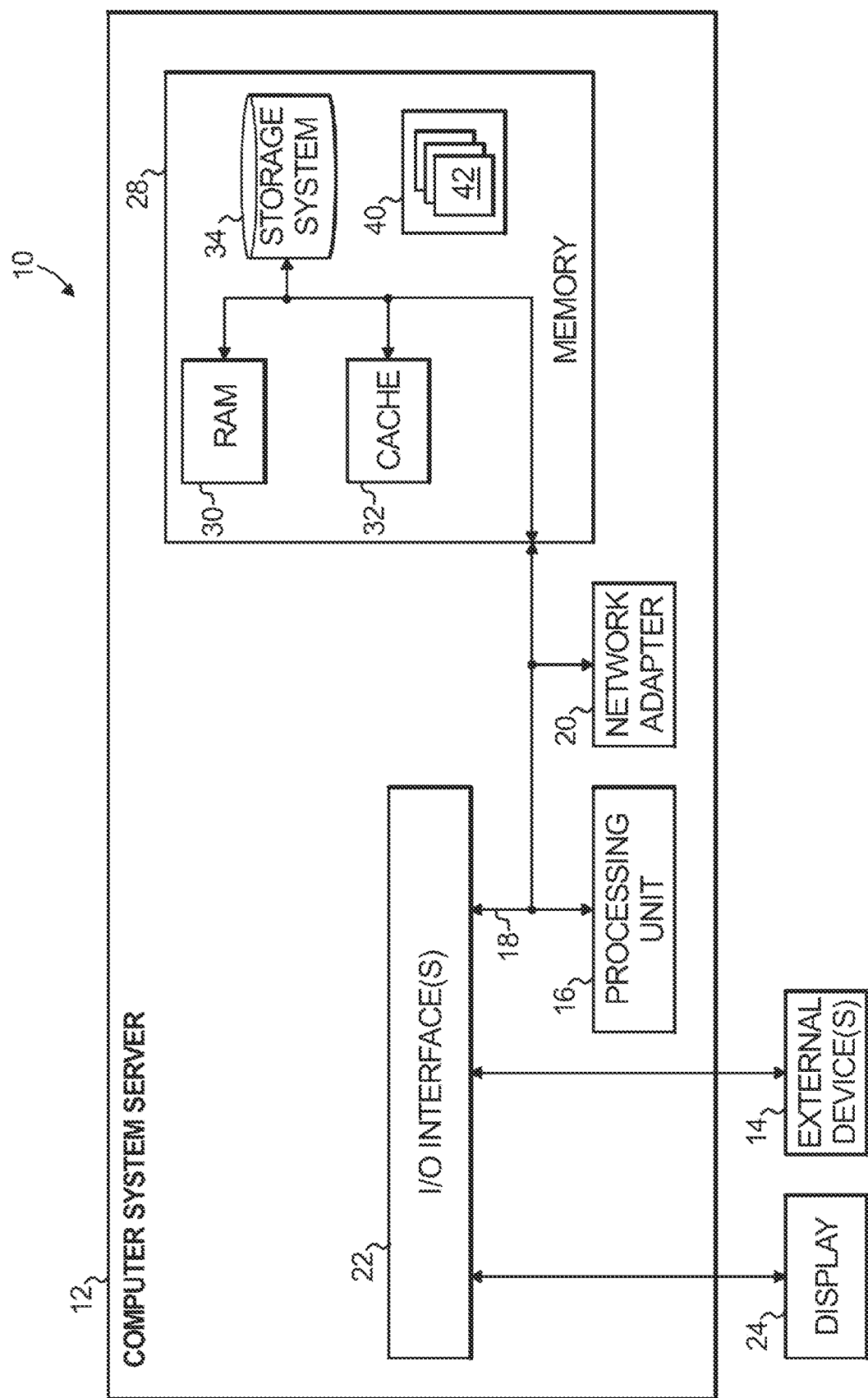
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for adverse reaction signal detection comprising:
   receiving an electronic input, the electronic input comprising a drug and outcome pair;
   classifying the drug and outcome pair as having one of a positive control and a negative control;
   determining a probability measure of an adverse drug event relation based on results of the classification;
   training a neural network to jointly leverage reported drug, outcome information and a training heterogeneous semantic hierarchy, training the neural network further comprising:
   inputting a given drug and a corresponding drug class hierarchy as a directed acyclic graph into a first masked transformer followed by a position-aware self-attention layer to generate a single vector representation;
   inputting an outcome and a corresponding adverse event hierarchy into a second masked transformer to generate an outcome vector representation;
   generating negative outcome samples using a probabilistic distribution computed based on frequency counts of outcomes in an adverse event knowledge base;
   inputting a negative outcome and the corresponding adverse event hierarchy into the second masked transformer to generate a negative outcome vector representation; and
   training a binary classifier using drug-outcome as a positive example representation and drug-negative outcome as a negative example representation; and
   performing a classification of a candidate drug using the trained neural network.

2. The method of claim 1, wherein the reported drug and outcome information are accessed in one or more of an adverse event reporting system and a given heterogeneous semantic hierarchy.

3. The method of claim 1, further comprising mapping the drug of the drug and outcome pair to a drug class hierarchy using a medicinal class knowledge base.

4. The method of claim 1, further comprising mapping the outcome of the drug and outcome pair to an outcome hierarchy using an adverse event knowledge base.

5. The method of claim 1, further comprising identifying a potential adverse effect of the candidate drug based on one or more adverse effects of the drug and the determined probability.

6. The method of claim 1, further comprising detecting an adverse event signal for the drug based on the determined probability.

7. The method of claim 1, further comprising preventing administration of the drug in response to the probability measure being less than a probability threshold.

8. The method of claim 1, further comprising administering the drug in response to the probability measure being greater than or equal to a probability threshold.

9. The method of claim 1, further comprising identifying one or more studies to conduct for evaluating the drug based on detection of a new adverse reaction.

10. The method of claim 1, further comprising identifying one or more adverse events to be alert for in regard to the drug and a location in the medicinal class hierarchy graph corresponding to the drug.

11. An apparatus comprising:
    a memory; and
    at least one processor, coupled to said memory, and operative to perform operations comprising:
    receiving an electronic input, the electronic input comprising a drug and outcome pair;
    classifying the drug and outcome pair as having one of a positive control and a negative control;
    determining a probability measure of an adverse drug event relation based on results of the classification;
    training a neural network to jointly leverage reported drug, outcome information and a heterogeneous semantic hierarchy, training the neural network further comprising:
    inputting a given drug and a corresponding drug class hierarchy as a directed acyclic graph into a first masked transformer followed by a position-aware self-attention layer to generate a single vector representation;
    inputting an outcome and a corresponding adverse event hierarchy into a second masked transformer to generate an outcome vector representation;
    generating negative outcome samples using a probabilistic distribution computed based on frequency counts of outcomes in an adverse event knowledge base;
    inputting a negative outcome and the corresponding adverse event hierarchy into the second masked transformer to generate a negative outcome vector representation; and
    training a binary classifier using drug-outcome as a positive example representation and drug-negative outcome as a negative example representation; and
    performing a classification of a candidate drug using the trained neural network.

12. The apparatus of claim 11, the operations further comprising mapping the drug of the drug and outcome pair to a drug class hierarchy using a medicinal class knowledge base.

13. The apparatus of claim 11, the operations further comprising mapping the outcome of the drug and outcome pair to an outcome hierarchy using an adverse event knowledge base.

14. The apparatus of claim 11, the operations further comprising:
    obtaining one or more ancestors of a drug and an adverse event of the drug and outcome pair from a corresponding hierarchical multi-tier semantic network;
    concatenating the input sequences with their corresponding ancestors;
    performing an embedding lookup in an overall embedding matrix to prepare an input representation layer for each of a pair of transformers;
    processing the input representation layers using the corresponding transformer and computing an output representation by using a hierarchical-mask corresponding to each of the transformers;
    obtaining a final drug representation and an adverse event representation by passing outputs of the transformers to another multi-head attention layer; and
    calculating a strength of an adverse event relation between the drug and the adverse event by using a sigmoid function on a dot product between the final drug and adverse event representation.

* * * * *